W. E. BOCK.
POWER TRANSMISSION MECHANISM.
APPLICATION FILED MAY 27, 1910.

990,190.

Patented Apr. 18, 1911.
6 SHEETS—SHEET 1.

WITNESSES
C. H. Bills.
G. Gaskell.

INVENTOR
William Emil Bock.
By Owen & Owen,
his attys.

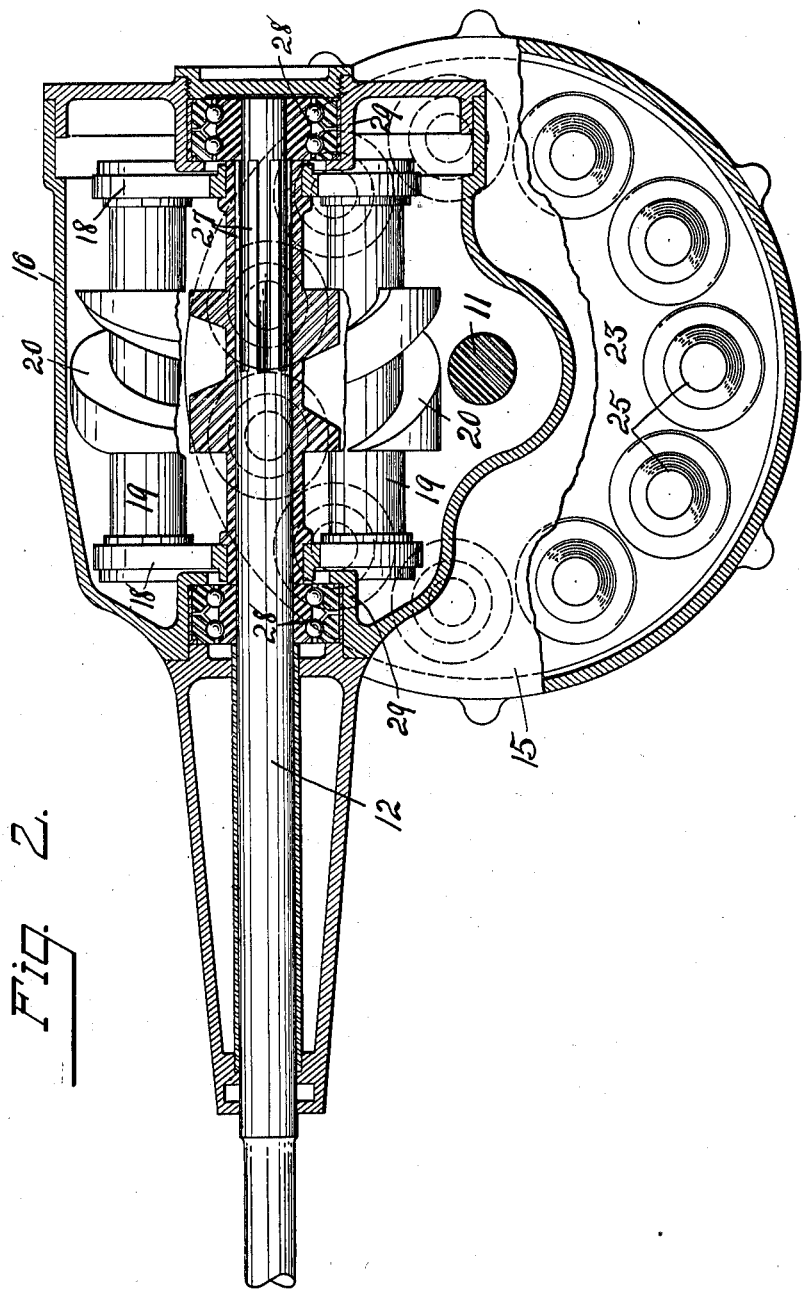

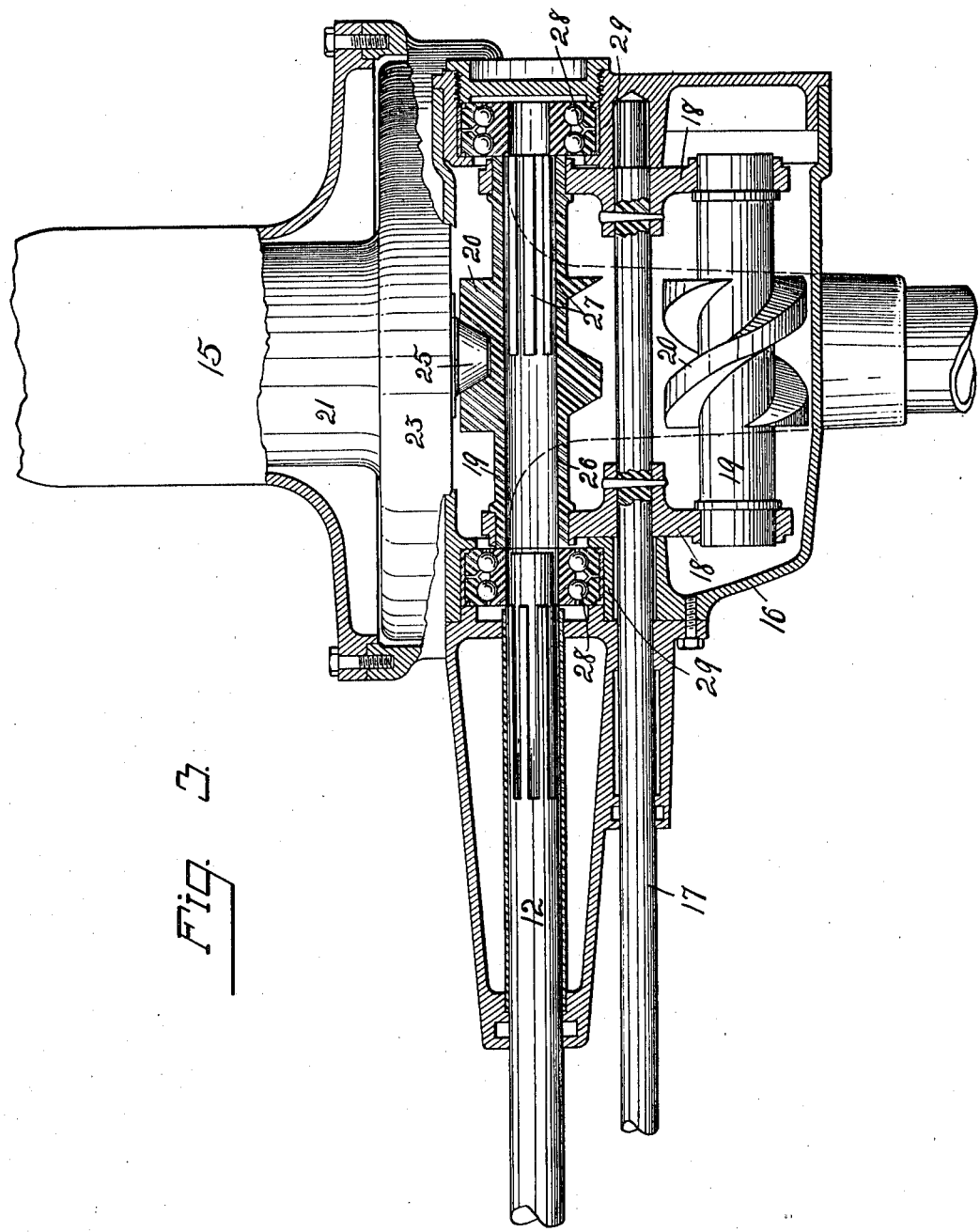

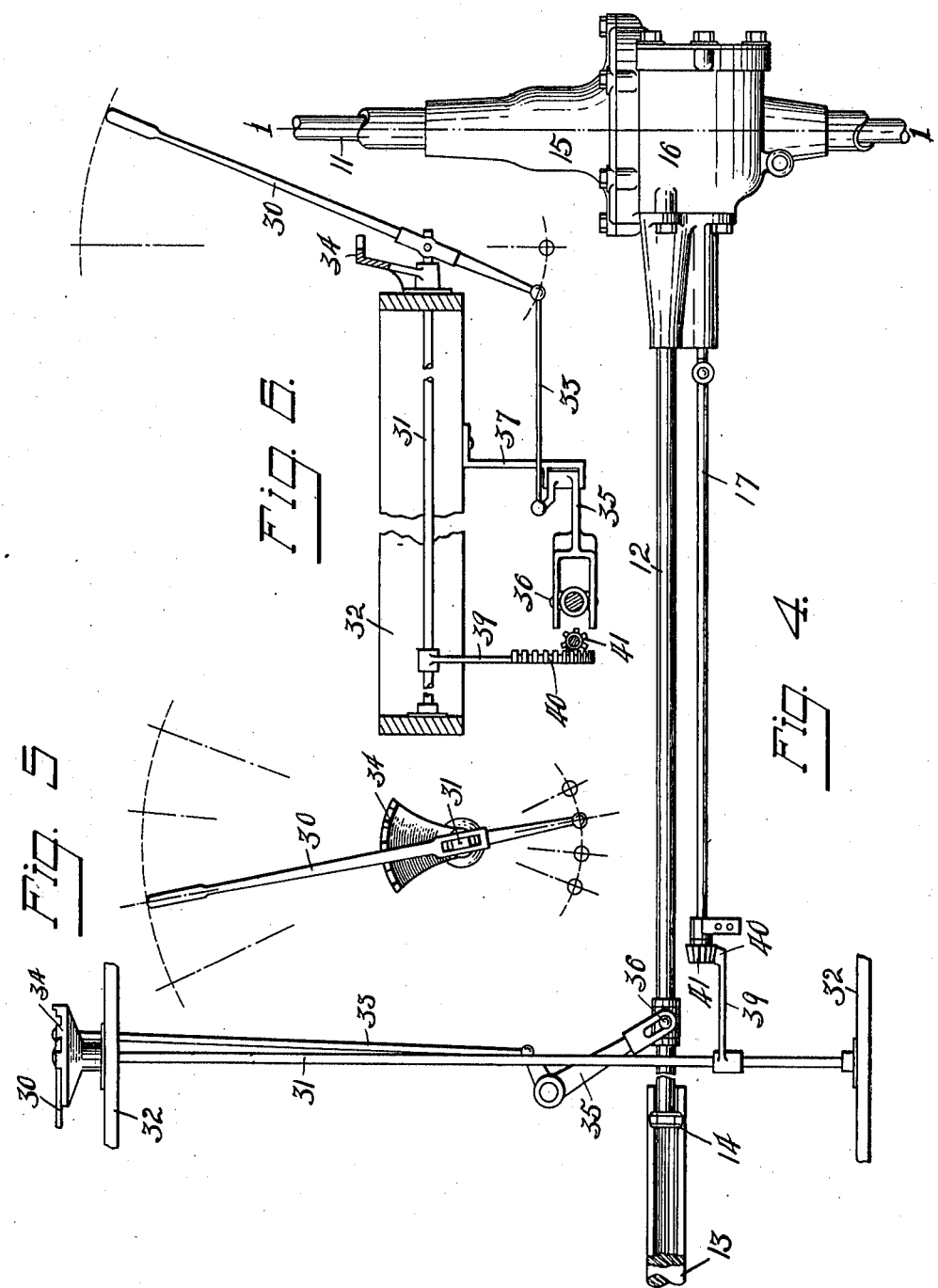

W. E. BOCK.
POWER TRANSMISSION MECHANISM.
APPLICATION FILED MAY 27, 1910.

990,190.

Patented Apr. 18, 1911.

6 SHEETS—SHEET 5.

WITNESSES:
C. H. Bills
G. Gaskell

INVENTOR.
William Emil Bock,
By Owen & Owen,
His attys.

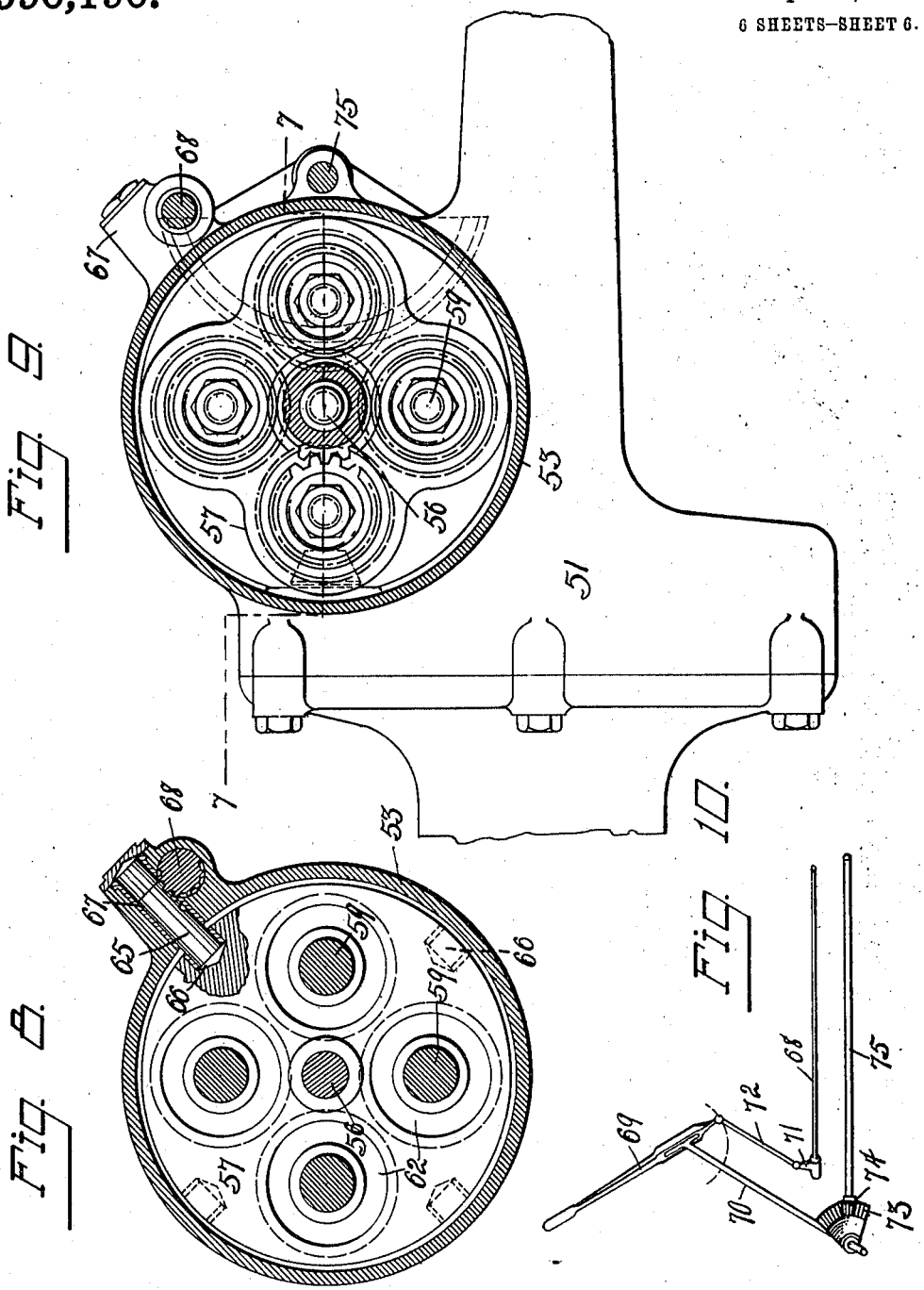

UNITED STATES PATENT OFFICE.

WILLIAM EMIL BOCK, OF TOLEDO, OHIO.

POWER-TRANSMISSION MECHANISM.

990,190. Specification of Letters Patent. Patented Apr. 18, 1911.

Original application filed December 18, 1909, Serial No. 533,812. Divided and this application filed May 27, 1910. Serial No. 563,730.

*To all whom it may concern:*

Be it known that I, WILLIAM EMIL BOCK, a citizen of the United States, and a resident of Toledo, in the county of Lucas and State of Ohio, have invented a new and useful Power-Transmission Mechanism; and I do hereby declare the following to be a full, clear, and exact description of the invention, such as will enable the others skilled in the art to which it appertains to make and use the same, reference being had to the accompanying drawings, and to the figures of reference marked thereon, which form a part of this specification.

My invention relates to power transmission mechanisms of the character adapted to transmit rotation in one or either of two directions at various speeds to a driven part from a driving member which is continuously driven in one direction at a uniform speed and is intended for use in motor driven vehicles, boats, or in any other connection for which it may be adapted or appropriate.

The object of my invention is the provision of an economical and highly efficient mechanism of this class, which is strong and durable in its construction, and easy and efficient in its operation, and which is adapted to simplify the construction and operation of mechanisms of this class and reduce the weight and cost of construction, repair and maintenance of such mechanism to a minimum.

A further object of my invention is to provide a direct drive between the driving and driven members in a mechanism of this class, thus avoiding the usual intermediate speed and reversing gears and the consequent power losses incident to the use of such forms of mechanisms, and effecting a neat and compact arrangement of such mechanism with the axle or other driven part.

The invention is fully described in the following specification, and while in its broader aspect it is capable of embodiment in numerous forms, a preferred and a modified form thereof are illustrated in the accompanying drawings, in which,—

Figure 1:
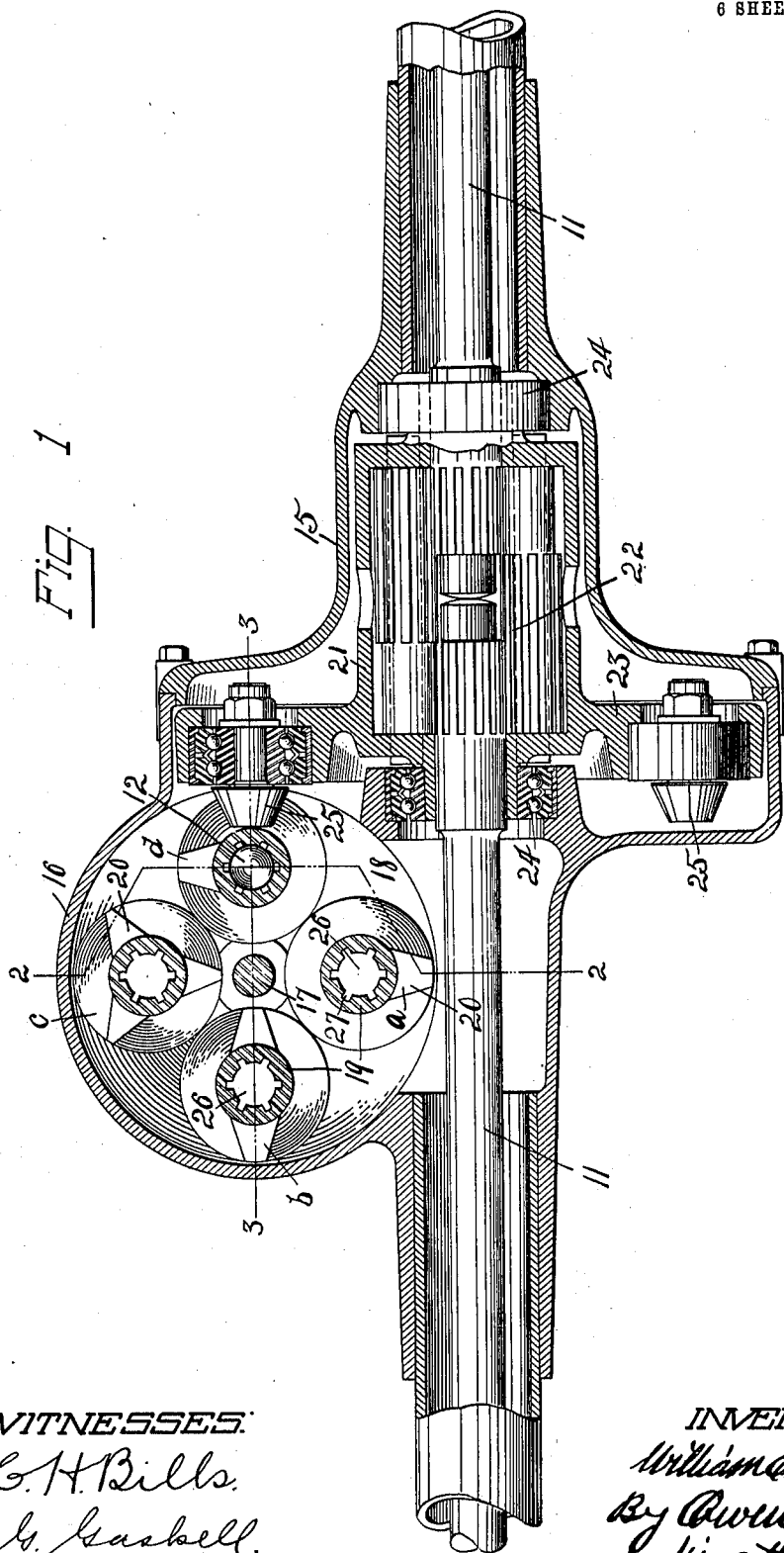
Figure 7:
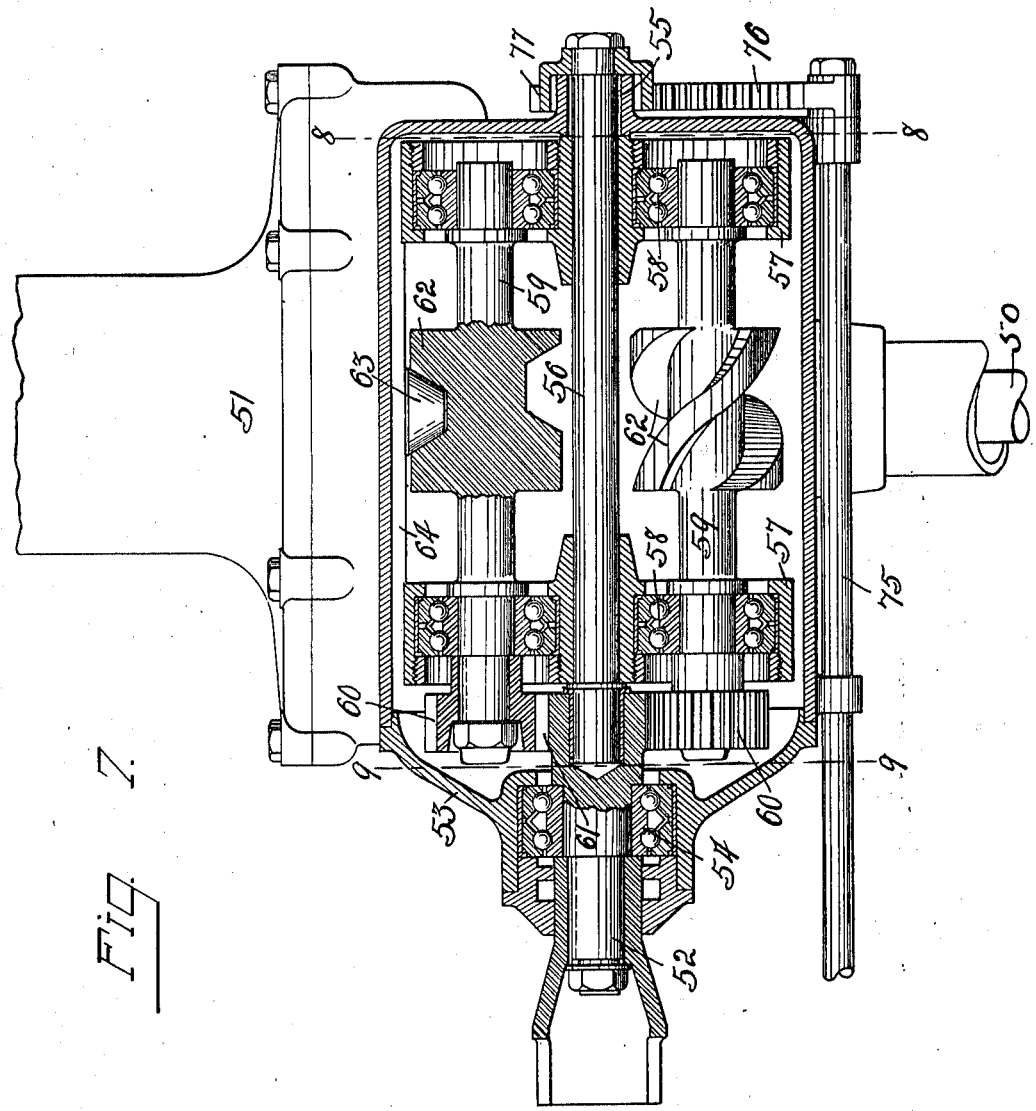

Figure 1 is a section of the preferred form of my invention taken on the line 1 1 in Fig. 4. Figs. 2 and 3 are sections on the lines 2 2 and 3 3, respectively, with parts in full and broken away. Fig. 4 is a plan of the invention with the associated control parts. Fig. 5 is a side elevation of the control-lever and attached parts. Fig. 6 is a transverse section of the mechanism looking in the direction of the control means. Fig. 7 is a horizontal section of a modified form of my invention taken on the line 7 7 in Fig. 9 with parts in full. Fig. 8 is a transverse section of the worm case and inclosed parts on the line 8 8 in Fig. 7, with a part broken away. Fig. 9 is a transverse section on the line 9 9 in Fig. 7, and Fig. 10 is a detail in perspective of the controlling mechanism of such form.

This application is a division of an application filed December 18, 1909, and allotted Serial No. 533,812.

Referring to Figs. 1 to 6, inclusive, of the drawings, 11 designates the driven shaft of the mechanism, or in the present instance the driving axle of a vehicle; 12 the longitudinally shiftable part of a drive-shaft 13, which shaft parts connect at their inner ends in a suitable manner, as at 14, to cause them to rotate together but to permit free relative longitudinal movements thereof, and 15 designates the case or housing which is carried by the axle 11 and incloses the power transmitting parts. Mounted in the part 16 of the case 15 is a shaft 17 which projects without the case in the same direction as and in parallelism with the shaft part 12. Keyed in spaced relation on the shaft 17 within the casing part 16 are the two disks or spiders 18, each having a series of equidistantly spaced concentric openings therein. Connecting these disks or spiders with their ends journaled in registering ones of such openings are a series of worm-shafts or sections 19, in the present instance four in number, which have threads 20 of the same axial pitch but of different leads to provide for low, high and intermediate speeds and a reverse, designated, respectively, *a*, *b*, *c*, and *d* in Fig. 1. The number of threads for each worm may be varied as the speed desired may require. Mounted loosely on the inner ends of two parts of the axle 11 is a drum 21, which incloses the differential gears 22 and carries a crown-gear 23 at one end thereof. 24, 24 designate suitable bearings for the case 15 on the hub ends of the drum 21. The teeth 25 of the gear 23 comprise truncated cone-shaped rollers, which are suitably mounted in the face of the gear for rotary movements relative thereto as indicated in Fig. 1. The worm shafts 19 are hollow or provided therethrough with axial openings 26, and on a turning of the shaft 17, are adapted to be successively thrown into position to mesh with the teeth 25 of the gear 23, and when each is in such position, the opening 26 therein axially registers with the outer end of the part 12 of the drive shaft. When a desired worm has been moved into mesh with the gear 23, the shaft part 12 is longitudinally shifted to project its outer end through the registering opening 26 in such worm and is caused to drive the worm therewith due to the provision of suitable interlocking means, such, for instance, as complemental ribs and grooves 27 on their coacting surfaces. The shaft part 12, when in driving engagement with the worm has bearings 28, which are carried within boxes 29 at the ends of the casing part 16 and also serve as end-thrust bearings for the engaged worm section. A controller-lever 30 is carried at one end of the shaft 31, which is journaled in the vehicle frame 32 transversely thereof, and is pivoted to such shaft for oscillatory movements longitudinally thereof. The lower end of the lever 30 has universal connection with an end of a thrust-rod 33, and when such lever is swung outwardly from the associated notched segment 34, the longitudinal movement imparted to the rod 33 effects a rocking of the bell-crank lever 35, to one arm of which it attaches, and a consequent longitudinal movement of the shaft part 12 with which the other arm of the lever 35 attaches, as indicated at 36, whereby to retract said shaft part from engagement with a worm 19, as indicated in Fig. 3. The lever 35 is fulcrumed to a bracket 37 projecting from a convenient frame part, see Fig. 6. The controller-lever having been swung away from the segment 34, as shown in Fig. 6, to effect a withdrawal of the shaft part 12 from within a worm section 19, the lever is then rocked in the desired direction to effect a rocking of the shaft 31, on which it is mounted, and the arm 39 carried thereby. The arm 39 is provided at its free end with a segmental rack 40, which meshes with the pinion 41 on the outer end of the shaft 17, and when rocked, causes a rotary movement of said shaft to shift the positions of the worm sections 19 carried thereby. The desired worm having been thrown into mesh with the gear 23, the lever 30 is swung back toward the segment 34 and into engagement with the registering notch therein, thus locking the desired worm section in driving engagement with the driven gear and shifting the section 12 of the drive shaft into driving engagement with such worm section. The operation of this form of my invention is clearly apparent from the foregoing description.

In the form of my invention illustrated in Figs. 7 to 10, inclusive, of the drawings, 50 designates the driven member or drive axle of a vehicle; 51 the case or housing mounted thereon, and 52 the drive shaft, which is journaled axially in one end of the cylindrical part 53 of said case, as shown at 54, Fig. 7. The part 53 of the case is disposed transversely of the axle 50 at one side thereof and has a central bearing 55 in the end opposite to the bearing 54 in which the outer end of the shaft 56 is journaled. The opposite or inner end of the shaft 56 is shown in the present instance as being loosely journaled in a bearing socket provided axially in the associated end of the drive shaft 52, which latter shaft end projects a short distance within the casing part. Disks or worm bearing members 57 are fixed in spaced relation on the shaft 56, and each carries a concentric series of suitable bearings 58 in which the adjacent ends of a set of worm shafts or sections 59 are mounted, thus adapting each worm shaft to rotate on its own axis and also to revolve bodily around the axis of the shaft 56. The end of each worm shaft which is adjacent the end of the drive shaft 52 is projected beyond its bearing in the associated disk 57 and carries a pinion 60 in mesh with a pinion 61 on the end of said drive shaft, whereby a rotation of the latter shaft drives all of the worms 59 in unison at uniform speeds. The worm shafts 59 are provided with threads 62 of different leads, and of single, double or multiple type as may be desired, which, on a revolution of the worm shafts about the axis of the shaft 56, are adapted to be selectively thrown into mesh with the teeth 63 of the crown-gear 64. The crown-gear 64 may be mounted on the vehicle axle or other driven part in a manner similar to that described for the crown-gear 23 of the mechanism shown in Figs. 1 to 6. It is thus evident that in the present construction the worms 59 are all continuously driven on a rotation of the drive shaft 52, and that by revolving the same may be thrown into mesh with the gear 64 whereby a forward rotation at different speeds or a reverse rotation may be imparted thereto, depending upon the form of the worm in mesh therewith. When a worm is in mesh with the gear, it is locked against revolution on the axis of the shaft 56 by a locking pin 65, which engages one of a series of sockets 66 provided in one of the disks or bearing members 57, see Figs. 8 and 9. This pin works in a radial socket 67 in a casing part 53 and has rack-teeth in the side thereof in mesh with the pinion or toothed surface of the control shaft 68, which is suitably journaled in said casing part at the side of the pin. The shaft 68 is rocked to effect an outward or releasing movement of the pin by an outward oscillation of the control-lever 69 longitudinally of the shaft 70 by which it is carried, which movement is communicated to the shaft 68 through the medium of an arm 71 thereon, and the rod 72, connecting said arm to the lower end of said lever as shown in Fig. 10. The shaft 70 on which the lever 69 is mounted carries an arm which terminates in a segmental rack 73 in mesh with a pinion 74 carried by a shaft 75. This shaft is journaled in one side of the casing part 53 longitudinally thereof and carries a segmental rack 76 at an end of said casing part in mesh with a pinion 77 on the outer end of the shaft 56.

It is thus apparent from the above description that a swinging of the lever 69 transversely of the shaft 70 will rock said shaft and the shaft 75 to which it is geared and also the segment 76 to rotate the shaft 56 and selectively shift any one of the rolls 59 to operative position. On a swinging of the lever 69 back to engage a notch in the associated segment (not shown) the shaft 68 is rocked to effect a return of the pin 65 to locking engagement with a registering socket 66 in the member 57.

I wish it understood that my invention is not limited to any specific construction or arrangement of the parts except in so far as such limitations are specified in the claims.

Having thus described my invention, what I claim as new and desire to secure by Letters Patent, is,—

1. In a mechanism of the class described, the combination of a driven member, a plurality of gears revoluble bodily about a common axis which is angled relative to the axis of said member to permit a selective meshing of the same with the driven member, and means for driving the meshing gear.

2. In a power transmission mechanism, the combination of a driven member, a plurality of worm sections revoluble bodily about a common axis to selectively place them in mesh with the driven member, means for shifting such sections relative to the driven member, and means for driving the meshing section.

3. In a power transmission mechanism, the combination of a driven member, a plurality of worm-sections revoluble bodily about an axis which is disposed at one side of the axis of said member, and capable of selectively meshing with such member, and means for driving at least the meshing one of such sections.

4. In a power transmission mechanism, the combination of a driven shaft, a gear on such shaft, a plurality of variable speed worms revoluble about a common axis which is disposed at one side of said driven shaft and capable of selectively meshing with the driven gear, and a drive shaft capable of engaging and driving any of the variable worms when in mesh with the driven gear.

5. In a power transmission mechanism, the combination of a driven gear, a plurality of variable speed gears revoluble about a common axis to selectively place them in mesh with the driven gear, said variable speed gears having their axes parallel and angled relative to the axis of the driven gear, and a drive shaft having driving connection with the variable speed gear in mesh with the driven gear.

6. In a power transmission mechanism, the combination of a driven gear, a plurality of variable speed worms revoluble about a common axis at one side of the gear to adapt them to selectively mesh with the gear, means for shifting the worms in unison to selectively mesh with said gear, and drive means in driving connection with the meshing worm.

7. In a power transmission mechanism, the combination of a driven gear, a shaft disposed at one side of such gear, members carried by such shaft, a plurality of variable speed worms journaled in said members, said worms having their axes parallel, means for rotating said shaft to revolubly shift the worms to selectively place the same in mesh with said gear, and drive means in driving connection with the meshing worm.

8. In a power transmission mechanism, the combination of a driven member, a plurality of variable speed and reverse worms revoluble about a common axis to selectively place the same in mesh with such member, means for locking the worms against revoluble movements, and mechanism operative to move such means to lock or permit shifting movements of said worms and to shift the worms to selectively place the same in mesh with the driven member.

9. In a power transmission mechanism, the combination of a driven member, a plurality of worms revoluble about a common axis to selectively place the same in mesh with the driven member, a shaft for driving the meshing worm, and mechanism operative to move such shaft to engage or release a worm and to shift the worms to selectively mesh with the driven member.

10. In a power transmission mechanism, the combination with a driven gear, a plurality of worm sections revolving about a common axis to selectively mesh with such gear, and a shaft for driving the meshing worm, of a mechanism operative to shift said shaft to engage or release a worm section and to shift the worm sections to selectively engage the gear.

11. In a power transmission mechanism, the combination with a driven gear, a plurality of worm sections revolubly movable about a common axis to selectively engage such gear, and a shaft for driving the meshing worm section, of a single-lever control mechanism operative to move the shaft to engage or release the meshing worm section and to shift the worm sections to selectively engage the gear.

12. In a power transmission mechanism, the combination of a driven gear, a plurality of variable speed worm sections revoluble in unison about a common axis to selectively engage such gear, a drive-shaft movable to engage or release the worm section in engagement with the gear, means movable to move the drive shaft into or out of engagement with a worm section, means for shifting the worm sections about their common axis to selectively engage the same with the gear and a common control lever for said two means.

13. In a power transmission mechanism, the combination of a driven member, a drive-shaft and a plurality of worm sections revoluble about a common axis and movable to place any one of such sections into shaft engaging position and in mesh with the driven member.

14. In a power transmission mechanism, the combination of a driven gear, a drive-shaft having a longitudinally shiftable part, a plurality of variable speed worm sections revoluble in unison and having axial openings provided with shaft engaging portions and mechanism operative to revolubly shift the worm sections to place any one of the same in mesh with said driven gear with its opening in axial register with said shaft part and to move the shaft into and out of such opening.

In testimony whereof, I have hereunto signed my name to this specification in the presence of two subscribing witnesses.

WILLIAM EMIL BOCK.

Witnesses:
C. W. OWEN,
E. E. THOMAS.